(12) United States Patent
Nguyen et al.

(10) Patent No.: US 11,108,750 B2
(45) Date of Patent: Aug. 31, 2021

(54) METHOD AND APPARATUS FOR DATA TRANSFER OVER A POWER LINE CONNECTION

(71) Applicant: THE BOEING COMPANY, Chicago, IL (US)

(72) Inventors: Nha Thanh Nguyen, Shoreline, WA (US); Sopheap Ya, Renton, WA (US); Anil Kumar, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 115 days.

(21) Appl. No.: 16/411,797

(22) Filed: May 14, 2019

(65) Prior Publication Data

US 2020/0366657 A1 Nov. 19, 2020

(51) Int. Cl.
*H04L 29/06* (2006.01)
*G06F 21/60* (2013.01)
*H04B 3/54* (2006.01)
*G06F 9/455* (2018.01)

(52) U.S. Cl.
CPC ........ *H04L 63/0478* (2013.01); *G06F 21/602* (2013.01); *H04B 3/542* (2013.01); *G06F 9/455* (2013.01)

(58) Field of Classification Search
CPC ....... H04L 63/0478; H04B 3/54; H04B 3/542; G06F 21/602
USPC ........................................................ 713/164
See application file for complete search history.

(56) References Cited

U.S. PATENT DOCUMENTS

| 10,153,807 | B1 | 12/2018 | Shi | |
|---|---|---|---|---|
| 2009/0172660 | A1* | 7/2009 | Klotz, Jr. | G06F 9/5077 718/1 |
| 2010/0115291 | A1* | 5/2010 | Buer | G06F 21/53 713/192 |
| 2014/0341309 | A1* | 11/2014 | Nguyen | H04B 3/54 375/257 |

OTHER PUBLICATIONS

European Search Report regarding European Patent Application Serial No. 20170987.0 dated Jun. 19, 2020; pp. 1-7.

* cited by examiner

*Primary Examiner* — Jacob Lipman
(74) *Attorney, Agent, or Firm* — Armstrong Teasdale LLP

(57) ABSTRACT

A broadband over powerline (BPL) unit is provided. The BPL unit includes at least one processor programmed to execute a first virtual machine and a second virtual machine, at least one memory device in communication with the at least one processor, and a powerline transceiver. The at least one processor is programmed to transmit and receive data over a three-phase power line via the powerline transceiver. The at least one processor is also programmed to receive, via the first virtual machine, a first plurality of data for transmission via the powerline transceiver, receive, via the second virtual machine, a second plurality of data for transmission via the powerline transceiver, transmit, via the powerline transceiver, the first plurality of data via a first phase, and transmit, via the powerline transceiver, the second plurality of data via a second phase.

20 Claims, 8 Drawing Sheets

METHOD AND APPARATUS FOR DATA TRANSFER OVER A POWER LINE CONNECTION

BACKGROUND

The field of the disclosure relates generally to methods and systems for secure data communication and more particularly, to methods and systems for increasing data transmission rates and security in communications across a three-phase power system.

Vehicles such as commercial aircraft, military aircraft, unmanned aircraft, and the various systems thereon, generate and consume considerable amounts of data. For example, engines are monitored at every stage of operation, which results in generation of significant amounts of data. Such engine monitoring data includes, for example, but not limited to compression ratios, rotation rate (RPM), temperature, and vibration data. In addition, fuel related data, maintenance, Airplane Health Monitoring (AHM), operational information, catering data, In-flight Entertainment Equipment (IFE) updates and passenger data like duty free shopping are routinely and typically generated onboard the aircraft.

At least some of these systems wirelessly connect to a ground system through a central airplane server and central transceiver for data transmission and reception. However, for certain critical systems and critical data are not configured for wireless transfer of data. Therefore, when an aircraft arrives at a gate, much of the data is downloaded manually from the aircraft. Specifically, data recording devices are manually coupled to interfaces on the aircraft and the data is collected from the various data generators or log books for forwarding and processing at a back office. In addition, the back office function transmits updated datasets, for example data related to a next flight(s) of the aircraft, to the aircraft.

Demand for additional communication channels and data transfer is driving rapid change in connection with such communications. Such increased demand is due, for example, to increasing reliance by ground systems upon data from the aircraft, as well as increased communication needs of the flight crew, cabin crew, and passengers. In addition, data diversity along with an increasing number of applications producing and consuming data in support of a wide range of aircraft operational and business processes puts additional demand on communications. However, many of these additional communication channels could require additional holes to be drilled into the aircraft instead of using existing resources. Furthermore, it is crucial that the data transmitted is secured to prevent authorized personnel from accessing secure data or introducing malicious data into the aircraft systems.

BRIEF DESCRIPTION

In one aspect, a broadband over powerline (BPL) unit is provided. The BPL unit includes at least one processor programmed to execute a first virtual machine and a second virtual machine, at least one memory device in communication with the at least one processor, and a powerline transceiver in communication with the at least one processor. The at least one processor is programmed to transmit and receive data over a power line via the powerline transceiver. The power line is a three-phase power line. The at least one processor is also programmed to receive, via the first virtual machine, a first plurality of data for transmission via the powerline transceiver. The at least one processor is further programmed to receive, via the second virtual machine, a second plurality of data for transmission via the powerline transceiver. In addition, the at least one processor is programmed to transmit, via the powerline transceiver, the first plurality of data via a first phase. Moreover, the at least one processor is programmed to transmit, via the powerline transceiver, the second plurality of data via a second phase.

In another aspect, a method for communicating via a BPL connection is provided. The method is implemented by a BPL unit including at least one processor in communication with at least one memory device. The method includes executing a first virtual machine and a second virtual machine. The method also includes receiving, via the first virtual machine, a first plurality of data for transmission via the BPL connection. The method further includes receiving, via the second virtual machine, a second plurality of data for transmission via the BPL connection. In addition, the method includes transmitting, via the BPL connection, the first plurality of data via a first phase of a power line associated with BPL connection. Moreover, the method includes transmitting, via the BPL connection, the second plurality of data via a second phase of the power line associated with BPL connection.

In still another aspect, a BPL system is provided. The BPL system includes a first BPL unit executing a first set of three virtual machines and a second BPL unit executing a second set of three virtual machines. The second BPL system is in communication with the first BPL unit via a BPL connection. The BPL connection is over a three-phase power line. Each of the first set of three virtual machines executed by the first BPL unit are associated with a different phase of the three-phase power line. Each of the second set of the three virtual machines executed by the second BPL unit are associated with a different phase of the three-phase power line. The first BPL unit and the second BPL unit communicate via the three phases of the three-phase power line simultaneously.

The features, functions, and advantages that have been discussed can be achieved independently in various embodiments or may be combined in yet other embodiments, further details of which can be seen with reference to the following description and drawings.

Figure 1:
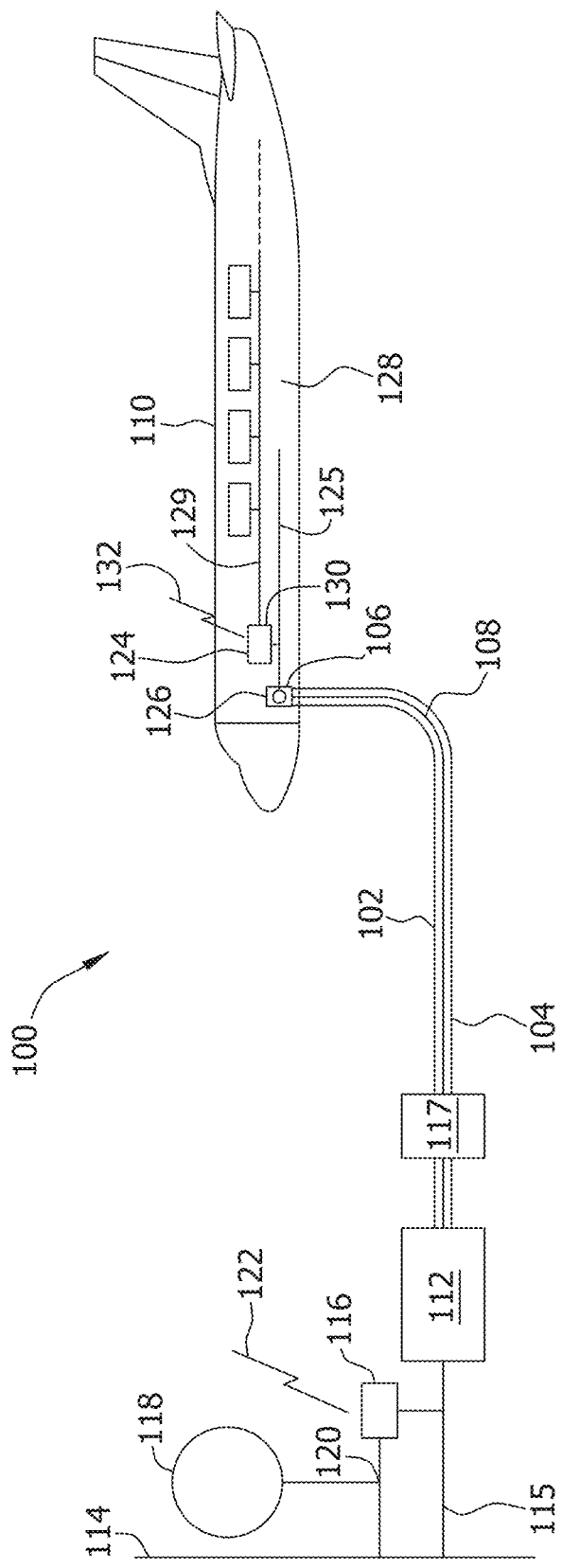
FIG. 1 illustrates a block diagram of a power and digital communication transmission system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

The described embodiments enable secure vehicle broadband communication with a data network. More particularly, the present disclosure is directed to using three-phase power with broadband over powerline (BPL) communications to enable secure and efficient aircraft information exchange. The Communication over Powerline technology may be used to improve the data transmission and increase data security from the airplane to the airline's back office and vice versa.

Described herein are computer systems such as the BPL master and slave computer devices and related computer systems. As described herein, all such computer systems include a processor and a memory. However, any processor in a computer device referred to herein may also refer to one or more processors wherein the processor may be in one computing device or in a plurality of computing devices acting in parallel. Additionally, any memory in a computer device referred to herein may also refer to one or more memories wherein the memories may be in one computing device or in a plurality of computing devices acting in parallel.

Furthermore, while the terms "master" and "slave" are used herein to describe different computer devices, in some embodiments, this different devices may be considered more parallel devices rather than having the master device control the slave device. In some embodiments, the master device may be controlled by the slave device. For the purposes of this disclosure, the slave device is the device on the vehicle and the master device is the device on the ground or at the location that the vehicle is currently docked or stopped.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured or unstructured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only and thus, are not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

FIG. 1 is a block diagram of a power and digital communication transmission system 100 in accordance with an exemplary embodiment of the disclosure. In the exemplary embodiment, power and digital communication transmission system 100 includes an electrical aircraft umbilical 102 comprising a supply end 104, a plug end 106, and an electrical conductor 108 extending there between. Plug end 106 is configured to mate with a vehicle such as an aircraft 110 such that electrical power is supplied to aircraft 110 through electrical conductor 108 from supply end 104. The electrical energy used to power commercial airplanes on the ground is 115 Vac, 400 Hz, three-phase power, and includes a neutral line. In the exemplary embodiment, supply end 104 couples to a ground power system 112 at an airport terminal gate 114. Ground power system 112 is configured to receive electrical power from a power supply through a power supply conduit 115. In other embodiments, ground power system 112 is located on a pier to couple to a boat, barge, or ship (not shown). In still other embodiments, ground power system 112 is positioned at a garage or service facility and is configured to couple to a wheeled vehicle, for example, but not limited to a car, a recreational vehicle (RV), or a train. Additionally, ground power system 112 may comprise another vehicle, such as a space vehicle, undersea or sea surface vehicle wherein one or both vehicles are moving with respect to each other and/or their surroundings while coupled through umbilical 102.

Power and digital communication transmission system 100 also includes a first interface device 116 electrically coupled to supply end 104. In the exemplary embodiment, first interface device 116 is electrically coupled to supply end 104 through power supply conduit 115 and ground power system 112, where interface device 116 is electrically coupled to the power supply conduit 115 through which ground power system 112 receives electrical power. In an alternative embodiment, first interface device 116 is electrically coupled to supply end 104 downstream of ground power system 112. In one embodiment, ground power system 112 is a distributed power system operating at voltages that are incompatible with aircraft 110. In such embodiments, a point of use power system 117 is utilized to step the voltage to a level that is compatible with aircraft 110. In another alternative embodiment, first interface device 116 is electrically coupled to electrical conductor 108 internal to ground power system 112. First interface device 116 is also coupled to a network 118 through a wired network access point 120 or a wireless communication link 122.

Power and digital communication transmission system 100 also includes a second interface device 124 electrically coupled to plug end 106 when umbilical 102 is coupled to aircraft 110. In the exemplary embodiment, second interface device 124 is electrically coupled to an onboard power bus 125 through plug end 106 through an umbilical plug 126 that traverses through a wall of a fuselage 128 of aircraft 110. Second interface device 124 is also coupled to an onboard network 129 through an onboard wired network access point 130 or an onboard wireless communication link 132. In some situations, onboard wireless link 132 may be unable to transmit from the vehicle to outside of the vehicle due to attenuation from the vehicle itself. Examples of onboard wireless link 132 may include, but are not limited to, 60 GHz or low data rate wireless such as IoT applications over BLE, Zigbee, Wi-Fi, and Bluetooth.

First interface device 116 is configured to transmit and receive data carrier signals through electrical conductor 108 while power is supplied to aircraft 110 through electrical conductor 108. First interface device 116 is also configured to convert the data carrier signals from and to a predetermined data format on the network. Second interface device 124 is electrically coupled to plug end 106 when umbilical 102 is coupled to aircraft 110. Second interface device 124 (e.g., a receiver and a transmitter, onboard transceiver) is configured to transmit and receive the data carrier signals via umbilical 102 between first interface device 116 and onboard network 129 while power is supplied to aircraft 110 through electrical conductor 108. In the exemplary embodiment, each of first interface device 116 and second interface device 124 are configured to detect a communication link established through the electrical conductor and report the link to system 100. Interface devices 116 and 124 are electrically matched with the characteristics of umbilical 102 including but not limited to wire size, shielding, length, voltage, load, frequency, and grounding.

In the exemplary embodiment, the predetermined data format is compatible with various network protocols including but not limited to, Internet network protocol, gatelink network protocol, Aeronautical Telecommunications Network (ATN) protocol, and Aircraft Communication Addressing and Reporting System (ACARS) network protocol.

In the exemplary embodiment, high-speed network service to aircraft 110 while parked in a service location such as an airport terminal gate is provided through a conductor of the aircraft ground power umbilical using for example, but not limited to Broadband over Power Line (BPL), X10, or similar technology. Use of this technology permits the airports and airlines to add a simple interface to the aircraft umbilical at the gate and for aircraft manufacturers to provide a matching interface within the aircraft to permit broadband Internet service to the aircraft through an aircraft power link in the umbilical.

Broadband over Power Line (BPL) is a technology that allows Internet data to be transmitted over power lines. (BPL is also sometimes called Power-line Communications or PLC.) Modulated radio frequency signals that include digital signals from the Internet are injected/added/modulated onto the power line using, for example, inductive or capacitive coupling. These radio frequency signals are injected into or superimposed onto the alternating current power waveform that is transmitted via the electrical power conductor at one or more specific points. The radio frequency signals travel along the electrical power conductor to a point of use. Little, if any, modification is necessary to the umbilical to permit transmission of BPL. The frequency separation in the umbilical substantially minimizes crosstalk and/or interference between the BPL signals and other wireless services. BPL permits higher speed and more reliable Internet and data network services to the aircraft than wireless methods. Using BPL also eliminates the need to couple an additional separate cable to aircraft 110 because it combines aircraft electrical power and Internet/data services over the same wire. System 100 uses for example, an approximately 2.0 MHz to approximately 80.0 MHz frequency or X10 similar ranges with the exact frequency range use defined and engineered by the characteristics and shielding of umbilical 102 and the allowable RFI/EMI levels in that particular environment.

In an embodiment, symmetrical hi-broadband BPL is used in umbilical 102 to transmit data communication signals at communication speeds with aircraft 110 at rates in the tens or hundreds of megabits per second (Mbps). Because the BPL link is dedicated to only one aircraft 110 and not shared as wireless is, actual throughput can be from two to ten times the wireless throughput in the same environment. In addition, the throughput is stable and reliable in airport environments, whereas the existing wireless Gatelink services vary with the amount of RF interference and congestion at each airport.

In the exemplary embodiment, each of the three phases of power may be used to transmit and receive data. For the purpose of this discussion, the three phases may be described as Phase A, Phase B, and Phase C. Each of these three phases may transmit separate data simultaneously. As described herein, Phase A may transmit flight critical safety data, while Phase B may be transmitting airline specific data and Phase C is transmitting entertainment data, such as movies and audio. In one embodiment, Phase A transmits data within the frequency of 0-10 MHz, Phase B transmits data from 11-20 MHz, and Phase C transmits between 21-30

MHz. In the exemplary embodiment, the three phases are separated based on frequency band, time, and encryption.

Furthermore, the data may be transmitted using Ground Base Management Protocol (GBMP)/Simple Network Management Protocol (SNMP). For example, the GBMP/SNMP may use four messages to communicate, such as TRAP, GET, GET-RESPONSE, and SET. In this example, the TRAP message may be used for situations such as failure on power, strange messages, and the wrong private key.

In addition, the data transmitted over the powerline may be encrypted. In the exemplary embodiment, the first interface device 116 may encrypt the data prior to it being transmitted over the power conduit 115. In this embodiment, second interface device 124 decrypts the data as received and routes it to the appropriate location. In some embodiments, data over each of the three phases is encrypted differently, such as by using a different private/public key pair. When data is transmitted from the second interface device 124 to the first interface device 116, the second interface device 124 encrypts the data and the first interface device 116 decrypts the data as described herein.

Figure 2:
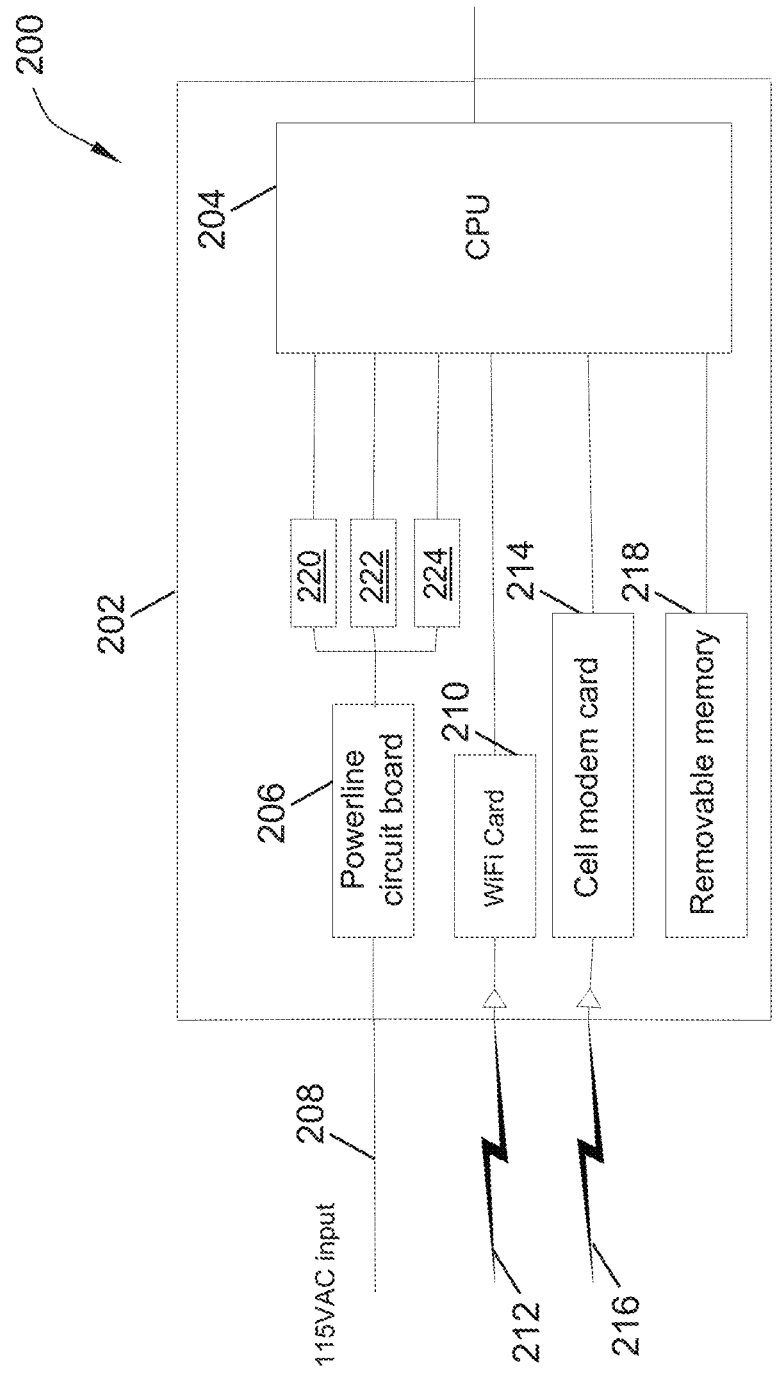
FIG. 2 illustrates a block diagram of a master control system in the power and digital communication transmission system shown in FIG. 1.

FIG. 2 illustrates a block diagram of a master control system 200 in the power and digital communication transmission system 100 shown in FIG. 1. In the exemplary embodiment, the master control system 200 includes a master control unit 202. In the exemplary embodiment, the master control unit 202 is coupled to the electrical power conduit 115 and functions as the first interface device 116 (shown in FIG. 1).

The master control unit 202 includes a central processing unit (CPU) 204 in communication with a powerline circuit board 206 (also known as a powerline transceiver). The powerline circuit board 206 allows the CPU 204 to communicate with other devices through a powerline and BPL connection 208. The BPL connection 208 uses powerlines similar to the electrical aircraft umbilical 102 (shown in FIG. 1).

The master control unit 202 also includes a Wi-Fi card 210 (also known as a Wi-Fi transceiver) for communicating with remotes devices via a first wireless connection 212. The master control unit 202 further includes a cell modem card 214 (also known as a cellular modem) for communicating with remoted devices via a second wireless connection 216. In some embodiments, master control unit 202 includes a removable memory 218. The removable memory 218 includes any memory card and device that may be removable attached to master control unit including, but not limited to, universal serial bus (USB) flash drives, external hard drives, and non-magnetic media. The CPU 204 is in communication with and in control of powerline circuit board 206, Wi-Fi card 210, cell modem card 214, and removable memory 218. While the above describes Wi-Fi and cellular connections cards 210 and 214 may also connect wirelessly through other methodologies, including, but not limited to, 60 Ghz, AeroMACS, WiMAX, Whitespace and Bluetooth.

In the exemplary embodiment, the CPU 204 detects that a connection has been made with another device over the BPL connection 208, such as to second interface device 124 (shown in FIG. 1). The CPU 204 receives a plurality of data via BPL connection 208 and the powerline transceiver 206. The CPU 204 determines a destination for the plurality of data. In some embodiments, the destination is another computer. In other embodiments, the destination is a plurality of computers or a computer network. In some embodiments, the destination is one or more computer systems associated with the airline, the airport, and/or an operations back office.

The master control unit 202 is remote from the destination. In the exemplary embodiment, the master control unit 202 able to remotely connect to the destination via one or more wireless networks. In these embodiments, the CPU 204 determines whether to route the plurality of data through the first wireless transceiver (i.e., the Wi-Fi card 210) or the second wireless transceiver (i.e., the cell modem card 214). The first and second wireless transceivers may also connect using 60 Ghz, AeroMACS, WiMAX, Whitespace, and Bluetooth.

In some embodiments, the CPU 204 tests the signal strength of the first wireless connection 212 and the second wireless connection 216. The CPU 204 compares the signal strength of the first wireless connection 212 and the second wireless connection 216 to determine which connection to use to transmit the plurality of data to the destination. Then the CPU 204 routes the plurality of data to the destination using the determined wireless connection. In some further embodiments, master control unit 202 also considers the reliability of the first and second wireless connections 212 and 216 in determining which wireless connection to use In some embodiments, if the signal strength of the first wireless connection 212 and the second wireless connection 216 are both below corresponding predetermined thresholds, then the CPU 204 stores the plurality of data on the removable memory 218. In some further embodiments, the CPU 204 transmits the plurality of data to the destination at a subsequent time when the signal strength of one of the first wireless connection 212 and the second wireless connection 216 exceeds the respective predetermined threshold.

In some further embodiments, the CPU 204 audits the voltage, current, and phase of the BPL connection 208 to determine if the connection is within parameters. The CPU 204 may determine whether or not to transmit the plurality of data based on the audit. Furthermore, the CPU 204 may determine whether or not to receive the data over the BPL connection 208 if the CPU 204 determines that the connection is not within parameters. This ensures that the BPL connection 208 is properly connected prior to transmitting a plurality of data to ensure both the security of the connection and the integrity of the data being received by the master control unit 202.

In some further embodiments, the master control unit 202 transmits data over the BPL connection 208 to the slave unit about future aircraft operations, such as, but not limited to, software updates for one or more systems, additional movies and/or other entertainment options, flight paths, and weather information. In these embodiments, the master control unit 202 may have received the data for uploading to the slave unit from the airport, the airline, or an operations back office.

In some additional embodiments, master control unit 202 is stored on aircraft 110. When aircraft 110 lands at an airport that does not have an existing BPL system, master control unit 202 is deployed to connect to one or more wireless networks at the airport. In some further embodiments, the master control unit 202 is secured with a password to ensured access by authorized users.

In the exemplary embodiment, the master control unit 202 executes three virtual machines (VM) 220, 222, and 224. Each one of these virtual machines is configured to transmit and receive data over the BPL connection 208 using a different phase. For the purposes of this discussion, VM 220 is associated with Phase A, VM 222 with Phase B, and VM 224 with Phase C. In the exemplary embodiment, the three VMs 220, 222, and 224 allow for a software solution rather than requiring three pairs of hardware adapters for transmitting over the three phases. This allows a single pair of hardware adapters to be used and guided by the virtual machines.

In some embodiments, the three VMs 220, 222, and 224 are executed by separate processors. In other embodiments, a single processor may execute more than one of the VMs. Furthermore, in some embodiments, the three VMs 220, 222, and 224 may be combined into a single virtual machine.

In the exemplary embodiment, each VM 220, 222, and 224 encodes each message with a tag to represent either which Phase the message is to be transmitted on or which VM the message is associated with. In the exemplary embodiment, the three VM are each associated with a priority, VM 220 transmits and receives high priority data, VM 222 transmits and receives medium priority data, and VM 224 transmits and receives low priority data. In this embodiment, high priority information is, for example, flight critical safety data, such as avionics data, and passenger personal data. Medium priority data is airline proprietary data, airline surveillance data, and other airplane data less critical than that considered high priority. Low priority data includes entertainment data, such as video, audio, and movies. While the examples described herein use priority to separate the three VMs/Phases, other schemes may be used and the data may be divided up based on other criteria in other embodiments.

In the exemplary embodiment, data that is being transmitted over the BPL connection 208 is encrypted to prevent unauthorized access. In the exemplary embodiment, the master control unit 202 encrypts all data prior to transmission using a first encryption method, such as, but not limited to, 128-AES (advanced encryption standard) and private/public key encryption. In some embodiments, only the payload is encrypted. In other embodiments, the entire message is encrypted. This embodiment may be used with frame based transmission.

In addition to the encryption provided by the master control unit 202, the VMs 220, 222, and 224 may also encrypt the data. In the exemplary embodiment, high priority data is encrypted using another encryption method, such as, but not limited to, 128-AES. This means that the high priority data is doubly encrypted. In this embodiment, the medium priority data may be encrypted using a different encryption method, such as, but not limited to, 64-AES. In the exemplary embodiment, low priority data is not additionally encrypted. For example, high priority data is first encrypted by VM 220 and then additionally encrypted by the master control unit 202 prior to transmission. In other embodiments, other encryption methods and schemes for encrypting the data being transmitted over the three phases may be used.

In addition to transmitting the data, the three VMs 220, 222, and 224 receive and decrypt data transmitted over the BPL connection 208 to the master control unit 202.

In the exemplary embodiment, the three VMs 220, 222, and 224 are in communication with each other. If one of the VMs 220, 222, and 224 finishes transmitting its data, that VM notifies the others to allow them to use the bandwidth of its assigned phase. For example, if VM 222 finishes transmitting the medium priority data, while the other two VMs 220 and 224 are still transmitting their data, then VM 222 will send a message to VMs 220 and 224. In this embodiment, VM 220 will start transmitting the high priority data over Phase A and Phase B, while VM 224 continues to use Phase C. In this example, VM 220 will encrypt the data that is to be transmitted over Phases A and B using the same encryption method. In the embodiment, described herein, the extra bandwidth is allocated base on priority. However, in other embodiments, different methods of allocating bandwidth may be used.

In some further embodiments, the CPU 204 allocates the bandwidth for the three phases. In these embodiments, when the CPU 204 determines that VM 222 is no longer transmitting, the CPU 204 allocates the bandwidth on Phase B to VM 220. In other embodiments, CPU 204 knows how much data each VM 220, 222, and 224 has to transmit and determines how best to allocate the bandwidth based on the corresponding amounts of data.

Figure 3:
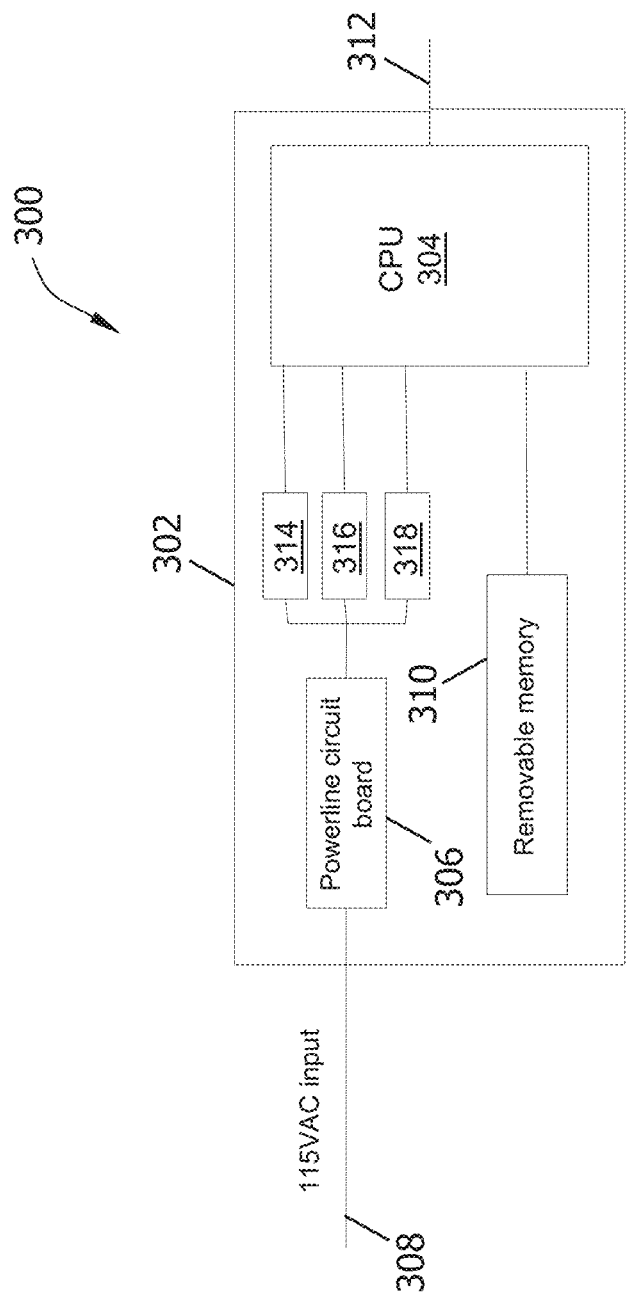
FIG. 3 illustrates a block diagram of a slave system in the power and digital communication transmission system shown in FIG. 1.

FIG. 3 illustrates a block diagram of a slave system 300 in the power and digital communication transmission system 100 shown in FIG. 1. In the exemplary embodiment, the slave system 300 includes a slave unit 302 that may be onboard a vehicle. In the exemplary embodiment, the slave unit 302 is similar to the second interface device 124 (shown in FIG. 1).

The slave unit 302 includes a processor or central processing unit (CPU) 304 in communication with a powerline circuit board 306 (also known as a powerline transceiver). The powerline circuit board 306 allows the CPU 304 to communicate with other devices through a BPL connection 308. The BPL connection 308 uses powerlines similar to the electrical aircraft umbilical 102 (shown in FIG. 1).

In some embodiments, the slave unit 302 includes a removable memory 310. Removable memory 310 includes any memory card and device that may be removable attached to master control unit including, but not limited to universal serial bus (USB) flash drives, external hard drives, and non-magnetic media. The processor or CPU 304 is in communication with and in control of powerline circuit board 306 and removable memory 310. In some embodiments, slave unit 302 is onboard an aircraft 110 and has a connection 312 to a plurality of systems aboard the aircraft. In these embodiments, slave unit 302 receives data from the plurality of systems about the operation of the aircraft.

In the exemplary embodiment, the CPU 304 receives a plurality of data from the plurality of systems over connection 312. The CPU 304 determines whether a connection has been made with another device over the BPL connection 308, such as to master control unit 202 (shown in FIG. 2). If a connection has been made, the CPU 304 transmits, via the powerline transceiver 306, the plurality of data to the BPL master control unit 202. If there is no connection, the CPU 304 stores the plurality of data in the removable memory 310.

In an exemplary embodiment, the processor or CPU 304 of slave unit 302 onboard the aircraft determines if the aircraft 110 is on the ground prior to determining whether or not the powerline transceiver 306 is connected to the master control unit 202. In some embodiments, the CPU 304 continuously receives data from the plurality of systems. The CPU 304 stores that data in the removable memory 310. When the CPU 304 determines that the aircraft is on the ground and connected to a master control unit 202, the CPU 304 transfers the data from the removable memory 310 to the master control unit 202 via the BPL connection 308.

In some further embodiments, the CPU 304 audits the voltage, current, and phase of the BPL connection 308 to determine if the connection is within parameters. The CPU 304 may determine whether or not to transmit the plurality of data based on the audit. Furthermore, the CPU 304 may determine whether or not to receive the data over the BPL connection 308 if the CPU 304 determines that the connection is not within parameters. This ensures that the BPL connection 308 is properly made prior to transmitting a plurality of data to ensure both the security of the connection and the integrity of the data being transmitted to and received from the master control unit 202.

In some further embodiments, the master control unit 202 transmits data over the BPL connection 308 to the slave unit 302 about future aircraft operations, such as, but not limited to, software updates for one or more systems, additional movies and/or other entertainment options, flight paths, and weather information. In some embodiments, the slave unit 302 routes the data to the appropriate systems on the vehicle. In other embodiments, the slave unit 302 acts as a pass-through to the vehicle's network.

In some further embodiments, the slave unit 302 is secured with a password to ensured access by authorized users.

In the exemplary embodiment, the slave unit 302 executes three virtual machines (VM) 314, 316, and 318. Each one of these virtual machines is configured to transmit and receive data over the BPL connection 308 using a different phase. For the purposes of this discussion, VM 314 is associated with Phase A, VM 316 with Phase B, and VM 318 with Phase C. In the exemplary embodiment, the three VMs 314, 316, and 318 allow for a software solution rather than requiring three pairs of hardware adapters for transmitting over the three phases. This allows a single pair of hardware adapters to be used and guided by the virtual machines.

In some embodiments, the three VMs 314, 316, and 318 are executed by separate processors. In other embodiments, a single processor may execute more than one of the VMs. Furthermore, in some embodiments, the three VMs 314, 316, and 318 may be combined into a single virtual machine.

In the exemplary embodiment, each VM 314, 316, and 318 encodes each message with a tag to represent either which Phase the message is to be transmitted on or which VM the message is associated with. As described herein, in the exemplary embodiment, the three VMs are each associated with a priority, VM 314 transmits and receives high priority data, VM 316 transmits and receives medium priority data, and VM 318 transmits and receives low priority data. In this embodiment, high priority information is, for example, flight critical safety data, such as avionics data, and passenger personal data. Medium priority data is airline proprietary data, airline surveillance data, and other airplane data less critical than that considered high priority. Low priority data includes entertainment data, such as video, audio, and movies.

In the exemplary embodiment, data that is being transmitted over the BPL connection 308 is encrypted to prevent unauthorized access. In the exemplary embodiment, the slave unit 302 encrypts all data prior to transmission using a first encryption method, such as, but not limited to, 128-AES (advanced encryption standard) and private/public key encryption. In some embodiments, only the payload is encrypted. In other embodiments, the entire message is encrypted. This embodiment may be used with frame based transmission.

In addition to the encryption provided by the slave unit 302, the VMs 314, 316, and 318 may also encrypt the data. In the exemplary embodiment, high priority data is encrypted using another encryption method, such as, but not limited to, 128-AES. This means that the high priority data is doubly encrypted. In this embodiment, the medium priority data may be encrypted using a different encryption method, such as, but not limited to, 64-AES. In the exemplary embodiment, low priority data is not additionally encrypted. For example, high priority data is first encrypted by VM 314 and then additionally encrypted by the slave unit 302 prior to transmission. In other embodiments, other encryption methods and schemes for encrypting the data being transmitted over the three phases may be used.

In addition to transmitting data, the three VMs 314, 316, and 318 receive and decrypt data transmitted over the BPL connection 308 to the slave unit 302.

In the exemplary embodiment, the three VMs 314, 316, and 318 are in communication with each other. If one of the VMs 314, 316, and 318 finishes transmitting its data, that VM notifies the others to allow them to use the bandwidth of its assigned phase. For example, if VM 316 finishes transmitting the medium priority data, while the other two VMs 314 and 318 are still transmitting their data, then VM 316 will send a message to VMs 314 and 318. In this embodiment, VM 314 will start transmitting the high priority data over Phase A and Phase B, while VM 318 continues to use Phase C. In this example, VM 314 will encrypt the data that is to be transmitted over Phases A and B using the same encryption method. In the embodiment, described herein, the extra bandwidth is allocated base on priority. However, in other embodiments, different methods of allocating bandwidth may be used.

In some further embodiments, the CPU 304 allocates the bandwidth for the three phases. In these embodiments, when the CPU 304 determines that VM 316 is no longer transmitting, the CPU 304 allocates the bandwidth on Phase B to VM 314. In other embodiments, CPU 304 knows how much data each VM 314, 316, and 318 has to transmit and determines how best to allocate the bandwidth based on the corresponding amounts of data.

Figure 4:
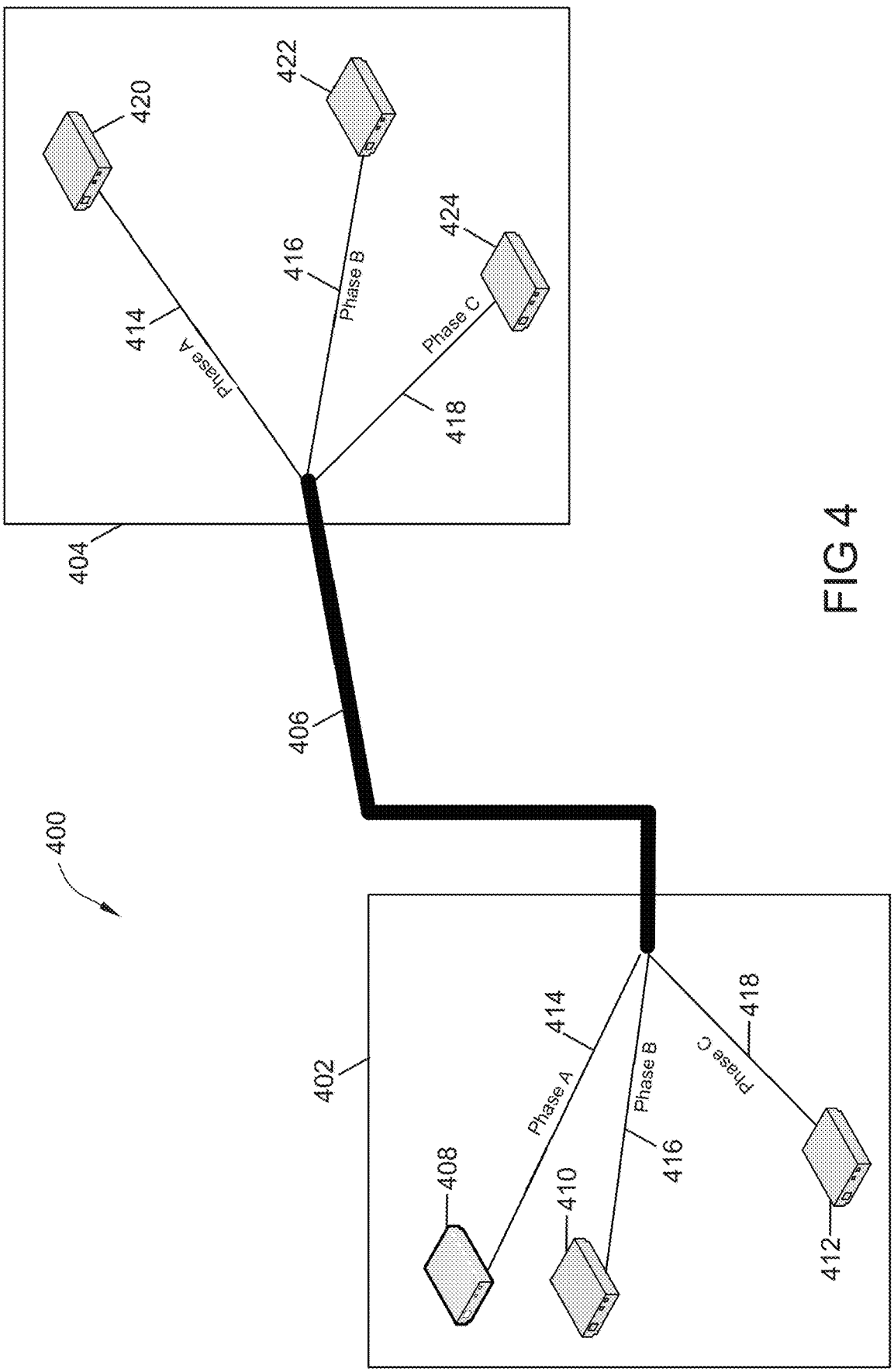
FIG. 4 illustrates a simplified flow diagram of a three-phase data transfer system using the power and digital communication transmission system shown in FIG. 1.

FIG. 4 illustrates a simplified flow diagram of a three-phase data transfer system 400 using the power and digital communication transmission system 100 shown in FIG. 1. In the exemplary embodiment, system 400 includes a first device 402 in communication with a second device 404 over a BPL connection 406. First device may be similar to first interface device 116 (shown in FIG. 1) and master control unit 202 (shown in FIG. 2). Second device 404 may be similar to second interface device 124 (shown in FIG. 1) and slave unit 302 (shown in FIG. 3). BPL connection 406 may be similar to BPL connection 208 (shown in FIG. 2) and BPL connection 308 (shown in FIG. 3) and uses powerlines similar to the electrical aircraft umbilical 102 (shown in FIG. 1).

In the exemplary embodiment, first device 402 and second device 404 are configured to communication over BPL connection 406. The data communicated from the first device 402 to the second device 404 may be provided from an airline office or other ground based computing devices. The data communicated from the second device 404 to the first device 402 may be provided by the aircraft 110 (shown in FIG. 1) itself. For example, this data may be from flight recorders, aircraft sensors, and other computer devices onboard the aircraft 110. In some embodiments, the first device 402 and the second device 404 include hardware adapters (not shown) to allow them to communicate over the BPL connection 406. In other embodiments, the first device 402 and the second device 404 are each in communication with a hardware adapter, such as a BPL modem or a powerline transceiver 206 and 306 (shown in FIGS. 2 and 3 respectively).

First device 402 includes three virtual machines 408, 410, and 412, which are each associated with a different phase of the BPL connection 406. VM 408 is associated with Phase A 414, VM 410 is associated with Phase B 416, and VM 412 is associated with Phase C 418. Second device 404 includes three virtual machines 420, 422, and 424, which are each associated with a different phase of the BPL connection 406. VM 420 is associated with Phase A 414, VM 422 is associated with Phase B 416, and VM 424 is associated with Phase C 418.

In the exemplary embodiment, when an aircraft 110 lands, an umbilical 102 is connected to that aircraft 110. Second device 404 is onboard the aircraft 110 and first device 402 is associated with one or more computers on the ground, such as at the gate. Once BPL connection 406 is established, second device 404 begins to transmit (or download) the data from the aircraft computers to the first device 402 and the computers on the ground.

In the exemplary embodiment, VM 420 transmits the high priority data over Phase A 414. VM 422 transmits the medium priority data over Phase B 416. VM 424 transmits the low priority data over Phase C 418. VM 420 encrypts the high priority data using a first encryption method. VM 422 encrypts the medium priority data using a second encryption method that is different from the first encryption method. VM 424 does not encrypt the low priority data. The powerline transceiver (or other hardware/software in the BPL connection 406) of the second device 404 encrypts the data prior to transmission using a third encryption method, that may be different from the first and the second encryption methods. This means that the high priority data and the medium priority data have been encrypted twice. The low priority data has only been encrypted once.

The first device 402 receives the data transmitted from the second device 404. The received data is decrypted by the powerline transceiver 206 associated with the first device 402 using the third method and routed to one of the three VMs 408, 410, and 412 based on the associated priority. For example, each data packet may contain a tag that states which priority it belongs to. In other embodiments, each VM 408, 410, 412, 420, 422, and 424 has an Internet Protocol (IP) associated with it and the data packet contains the IP address of the destination VM. The receiving VM decrypts the data, if necessary, and routes the data to the appropriate location. For example, airline specific data may be routed to one or more computers associated with the airline back office.

If one of the three VMs 420, 422, and 424 transmits all of its data before at least one of the other two are finished, then that VM's phase may be used by one of the other two VMs. For example, if VM 420 completes transmitting all of the high priority data, then VM 422 will begin transmitting the medium priority data on Phases A 414 and B 416. VM 422 will transmit the medium priority on both Phases 414 and 416 using the second encryption method. The first device 402 will recognize the data on Phases A 414 and B 416 as medium priority data and route that data to VM 410. In this example, VM 422 could also transmit the medium priority data on Phase A 414 and allow VM 424 to transmit low priority data on Phases B 416 and C 418, simultaneously. In another example, if VMs 420 and 422 have both completed their transmission, then VM 424 may use all three Phases 414, 416, and 418, simultaneously. In some embodiments, how the different VMs may determine how to transmit data and which Phase to use may be based on one or more attributes the data being transmitted over the BPL connection 406, the size of the data being transmitted, and user preferences.

When all of the VMs 420, 422, and 424 of second device 404 are finished transmitting data from the aircraft 110, first device 402 begins transmitting data to the aircraft 110. First device 402 uses the same methodology as described above for second device 404, just the roles are reversed.

In some embodiments, the different VMs 420, 422, and 424 may begin transmitting at different times. For example, VMs 420 and 424 may begin transmitting at time zero, while VM 422 doesn't begin transmitting until five minutes later. This may allow one of the other VMs 420 and 424 to use the unused Phase B 416 for those five minutes. In other examples, VM 420 may begin transmitting at time zero. VM 422 may begin transmitting five minutes after VM 420. VM 424 may begin transmitting five minutes after VM 422. This may allow the transmitting VMs to use the unused bandwidth on the other phases.

Figure 5:
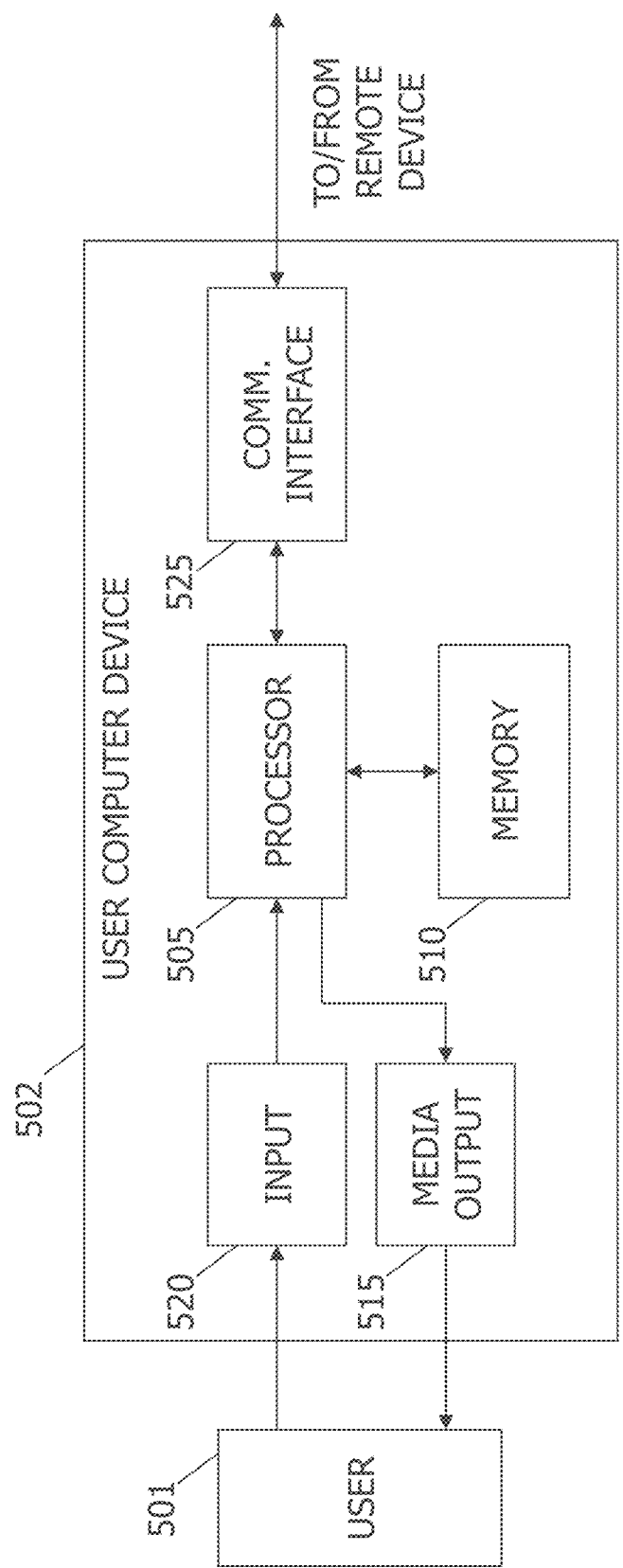
FIG. 5 illustrates an example configuration of a client system shown in FIGS. 1 and 4, in accordance with one embodiment of the present disclosure.

FIG. 5 illustrates an example configuration of a client system shown in FIGS. 1 and 4, in accordance with one embodiment of the present disclosure. User computer device 502 is operated by a user 501. User computer device 502 may include first interface device 116, second interface device 124 (both shown in FIG. 1), master control unit 202 (shown in FIG. 2), slave unit 302 (shown in FIG. 3), first device 402, and second device 404 (both shown in FIG. 4). User computer device 502 includes a processor 505 for executing instructions. In some embodiments, executable instructions are stored in a memory area 510. Processor 505 may include one or more processing units (e.g., in a multi-core configuration). Memory area 510 is any device allowing information such as executable instructions and/or transaction data to be stored and retrieved. Memory area 510 may include one or more computer-readable media.

User computer device 502 also includes at least one media output component 515 for presenting information to user 501. Media output component 515 is any component capable of conveying information to user 501. In some embodiments, media output component 515 includes an output adapter (not shown) such as a video adapter and/or an audio adapter. An output adapter is operatively coupled to processor 505 and operatively couplable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 515 is configured to present a graphical user interface (e.g., a web browser and/or a client application) to user 501. A graphical user interface may include, for example, one or more settings for connecting to another device via a power cable and/or receiving authentication information. In some embodiments, user computer device 502 includes an input device 520 for receiving input from user 501. User 501 may use input device 520 to, without limitation, select and/or enter a setting for a network. Input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 515 and input device.

User computer device 502 may also include a communication interface 525, communicatively coupled to a remote device such as master control unit 202, slave unit 302, first device 402, or second device 404. Communication interface 525 may include, for example, a wired or wireless network adapter and/or a wireless data transceiver for use with a mobile telecommunications network.

Stored in memory area 510 are, for example, computer-readable instructions for providing a user interface to user 501 via media output component 515 and, optionally, receiving and processing input from input device 520. The user interface may include, among other possibilities, a web browser and/or a client application. Web browsers enable users, such as user 501, to display and interact with media and other information typically embedded on a web page or a website from master control unit 202, slave unit 302, first device 402, or second device 404. A client application allows user 501 to interact with, for example, master control unit 202, slave unit 302, first device 402, or second device 404. For example, instructions may be stored by a cloud service and the output of the execution of the instructions sent to the media output component 515.

Figure 6:
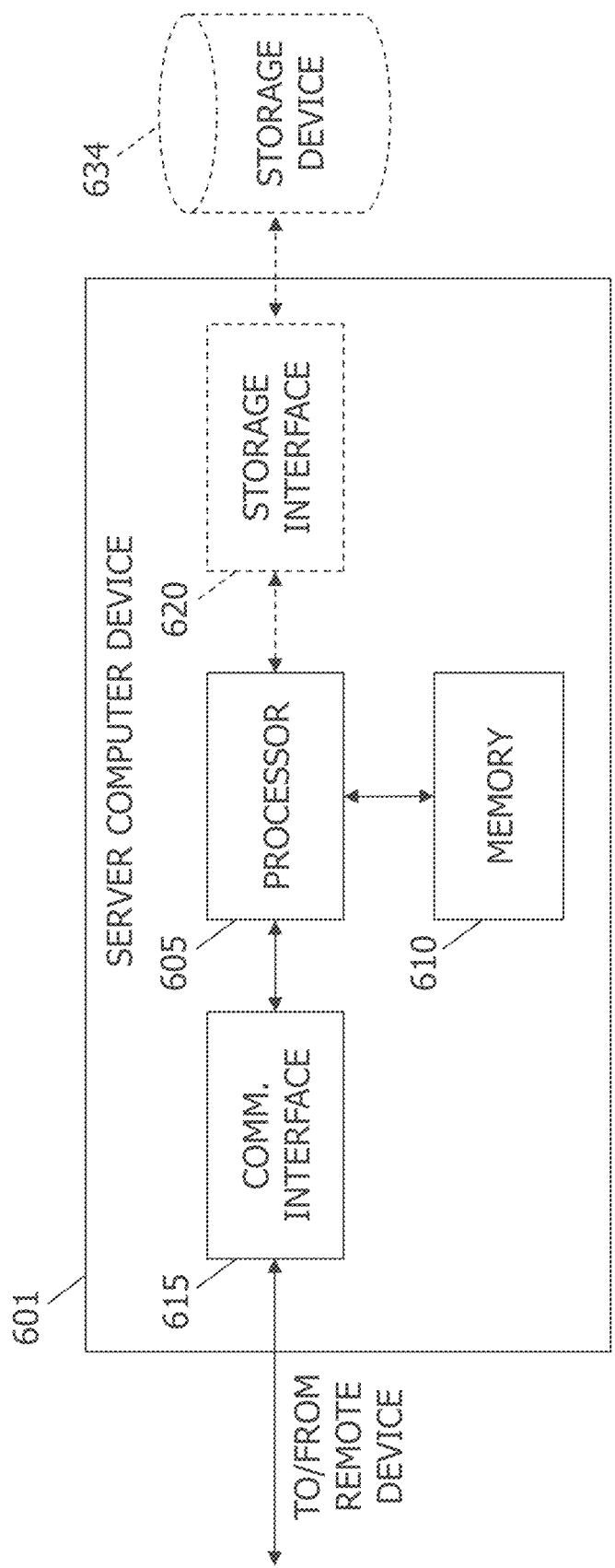
FIG. 6 illustrates an example configuration of a server system shown in FIGS. 1 and 4, in accordance with one embodiment of the present disclosure.

FIG. 6 illustrates an example configuration of a server system shown in FIGS. 1 and 4, in accordance with one embodiment of the present disclosure. Server computer device 601 may include, but is not limited to, first interface device 116, second interface device 124 (both shown in FIG. 1), master control unit 202 (shown in FIG. 2), slave unit 302 (shown in FIG. 3), first device 402, and second device 404 (both shown in FIG. 4). Server computer device 601 also includes a processor 605 for executing instructions. Instructions may be stored in a memory area 610. Processor 605 may include one or more processing units (e.g., in a multi-core configuration).

Processor 605 is operatively coupled to a communication interface 615, such that server computer device 601 is capable of communicating with a remote device such as another server computer device 601, master control unit 202, slave unit 302, first device 402, and second device 404. For example, communication interface 615 may receive weather information from computer devices connected to the master control unit 202 via the Internet.

Processor 605 may also be operatively coupled to a storage device 634. Storage device 634 is any computer-operated hardware suitable for storing and/or retrieving data, such as, but not limited to, data associated with a database. In some embodiments, storage device 634 is integrated in server computer device 601. For example, server computer device 601 may include one or more hard disk drives as storage device 634. In other embodiments, storage device 634 is external to server computer device 601 and may be accessed by a plurality of server computer devices 601. For example, storage device 634 may include a storage area network (SAN), a network attached storage (NAS) system, and/or multiple storage units such as hard disks and/or solid state disks in a redundant array of inexpensive disks (RAID) configuration.

In some embodiments, processor 605 is operatively coupled to storage device 634 via a storage interface 620. Storage interface 620 is any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Processor 605 executes computer-executable instructions for implementing aspects of the disclosure. In some embodiments, processor 605 is transformed into a special purpose microprocessor by executing computer-executable instructions or by otherwise being programmed. For example, processor 605 is programmed with the instructions such as are illustrated below.

Figure 7:
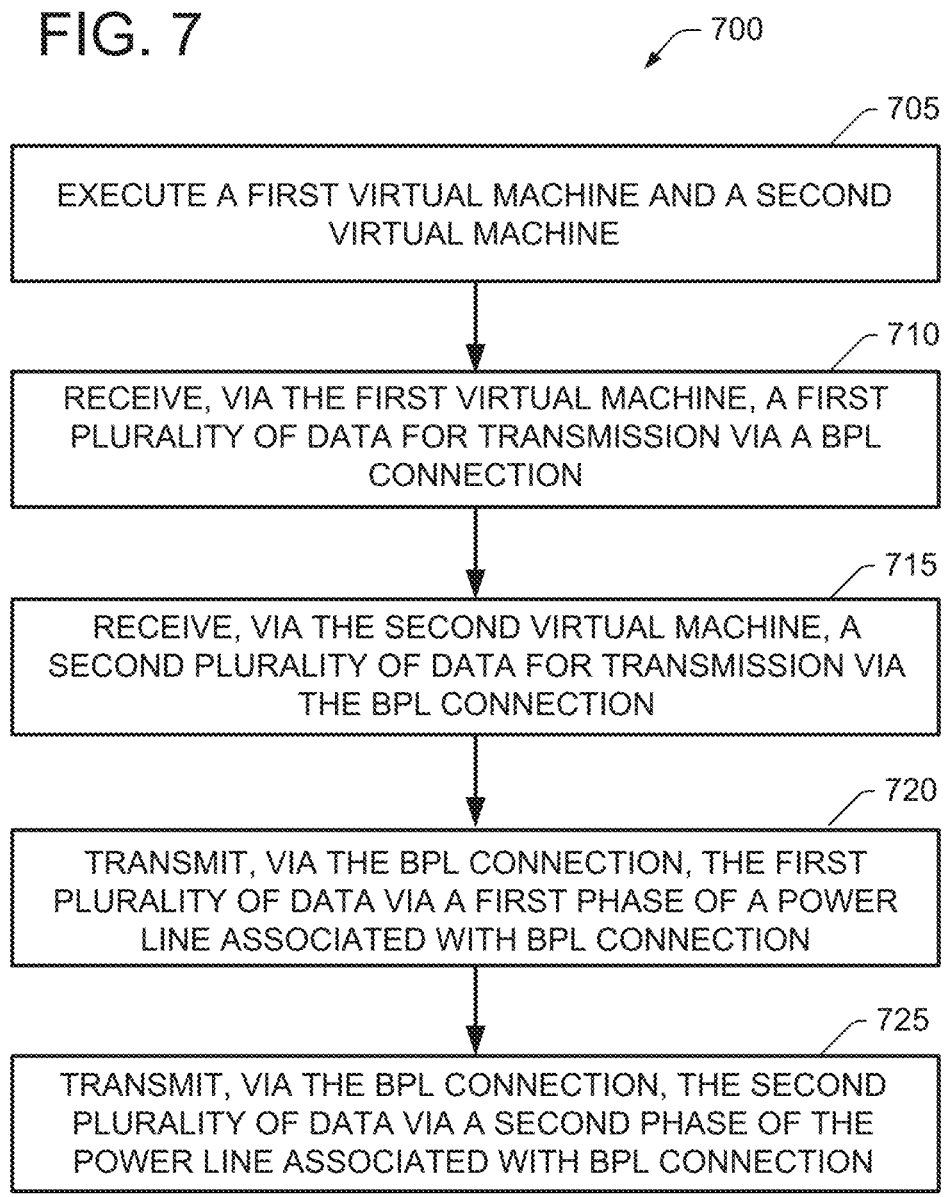
FIG. 7 is a flow chart of a process for communicating using the power and digital communication transmission system shown in FIG. 1 and the three-phase data transfer system shown in FIG. 4.

FIG. 7 is a flow chart of a process 700 for communicating using the power and digital communication transmission systems 100 and the three-phase data transfer system 400 shown in FIGS. 1 and 4. In the exemplary embodiment, process 700 is performed by at least one of first interface device 116, second interface device 124, master control unit 202 (shown in FIG. 2), slave unit 302 (shown in FIG. 3), first device 402, or second device 404 (both shown in FIG. 4).

In the exemplary embodiment, first device 402 executes 705 a first virtual machine 408 and a second virtual machine 410 (both shown in FIG. 4). The first virtual machine 408 is associated with a first Phase 414 of a BPL connection 406 (both shown in FIG. 4). The second virtual machine 410 is associated with a second Phase 416 (shown in FIG. 4) of the BPL connection 406. In the exemplary embodiment, the first device 402 also executes a third virtual machine 412 associated with the third Phase 418 (both shown in FIG. 4).

In the exemplary embodiment, the first device 402 receives 710 a first plurality of data for transmission via the BPL connection 406 from the first virtual machine 408. The first device 402 receives 715 a second plurality of data for transmission via the BPL connection 406 from the second virtual machine 410. In some embodiments, the first device 402 receives a third plurality of data for transmission via the BPL connection 406 from the third virtual machine 412.

In the exemplary embodiment, the first device 402 transmits 720 the first plurality of data over the BPL connection 406 via a first phase of a power line (such as electrical power conduit 115 shown in FIG. 1) associated with BPL connection 406. The first device 402 transmits 725 the second plurality of data over the BPL connection 406 via a second phase of the power line associated with BPL connection 406. In some embodiments, the first device 402 transmits the third plurality of data over the BPL connection 406 via a third phase of the power line associated with BPL connection 406. In some embodiments, the first device 402 transmits the first plurality of data, the second plurality of data, and the third plurality of data, simultaneously.

In some embodiments, the first device 402 determines that the first plurality of data is finished transmitting. The first device 402 then transmits the remaining second plurality of data via the first phase 414 and the second phase 416. In some further embodiments, the first device 402 determines that the first plurality of data and the second plurality of data are finished transmitting. The first device 402 then transmits the remaining third plurality of data via the first phase 414, the second phase 416, and the third phase 418.

In some embodiments, the first plurality of data is associated with a first priority and the second plurality of data is associated with a second priority. The first priority and the second priority are encoded in the transmissions via the BPL connection 406. In some further embodiments, the third plurality of data is associated with a third priority that is also encoded in its transmissions over the BPL connection 406.

In some embodiments, the first virtual machine 408 encrypts the first plurality of data using a first encryption method. The second virtual machine 410 encrypts the second plurality of data using a second encryption method. In these embodiments, the second encryption method is different from the first encryption method. In some additional embodiments, the powerline transceiver 206 associated with the first device 402 is configured to encrypt data to be transmitted using a third encryption method.

The first device 402 receives a fourth plurality of data via the powerline transceiver 206. The first device 402 determines which virtual machine to route the fourth plurality of data. Then the first device 402 routes the fourth plurality of data to the corresponding virtual machine.

Figure 8:
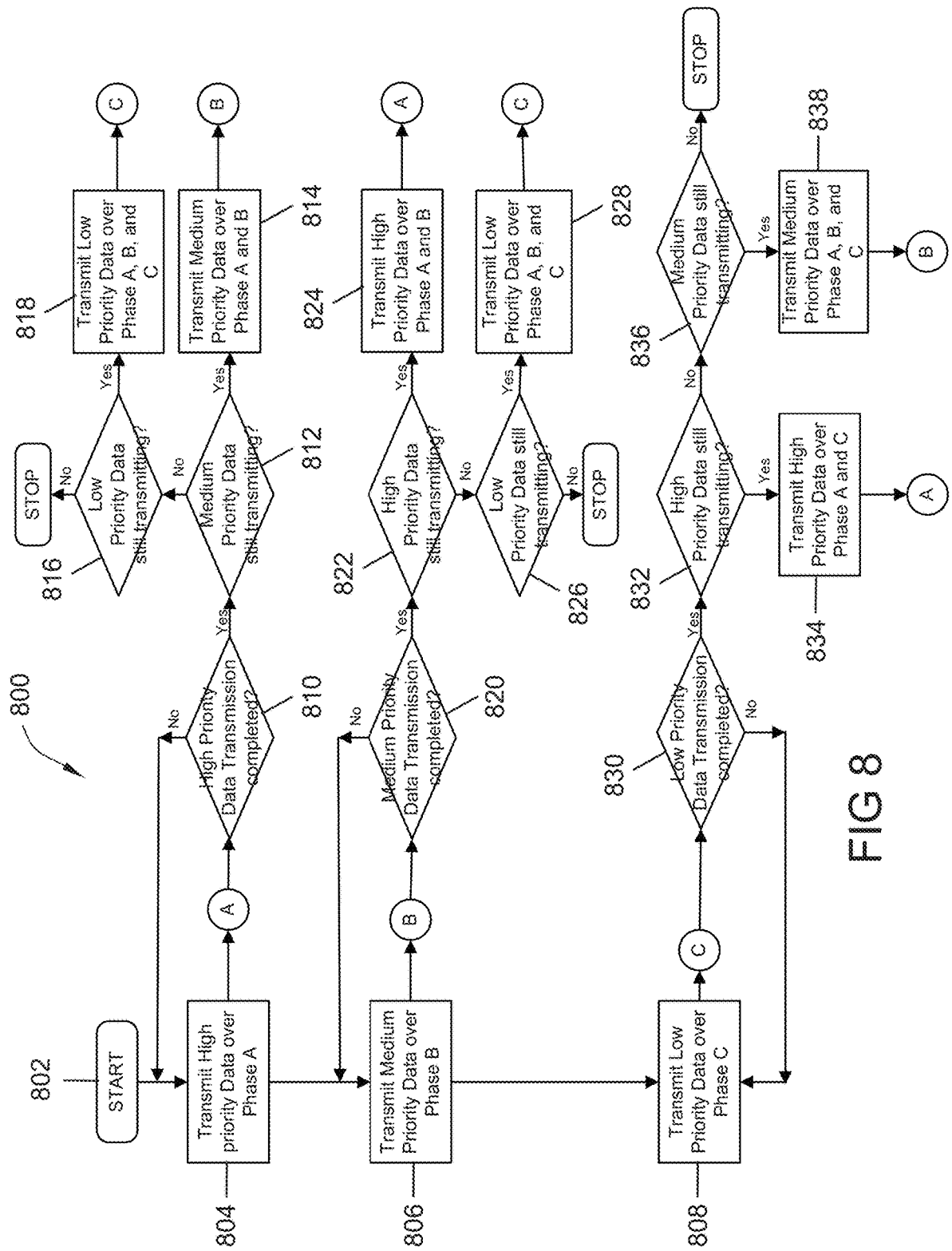
FIG. 8 is a flow chart of an exemplary process for managing data traffic over the three-phase data transfer system shown in FIG. 4.

FIG. 8 is a flow chart of an exemplary process 800 for managing data traffic over the three-phase data transfer system 400 shown in FIG. 4. In the exemplary embodiment, process 800 is performed by at least one of first interface device 116, second interface device 124, master control unit 202 (shown in FIG. 2), slave unit 302 (shown in FIG. 3), first device 402, or second device 404 (both shown in FIG. 4).

In the exemplary embodiment, process 800 begins 802 with the system 400 transmitting high priority data 804 over Phase A 414 (shown in FIG. 4), transmitting medium priority data 806 over Phase B 416 (shown in FIG. 4), and transmitting low priority data 808 over Phase C 418 (shown in FIG. 4).

The system 400 checks to determine whether the high priority data transmission is complete 810. If not, then the system 400 continues transmitting high priority data 802. If yes, then the system 400 checks if medium priority data is still being transmitted 812. If yes, then the system 400 transmits medium data 814 over Phases A 414 and B 416. If not, then the system 400 checks if low priority data is still being transmitted 816. If yes, then the system 400 transmits low priority data 818 over Phases A 414, B 416, and C 418.

The system 400 checks to determine whether the medium priority data transmission is complete 820. If not, then the system 400 continues transmitting medium priority data 804. If yes, then the system 400 checks if high priority data is still being transmitted 822. If yes, then the system 400 transmits high data 824 over Phases A 414 and B 416. If not, then the system 400 checks if low priority data is still being transmitted 826. If yes, then the system 400 transmits low priority data 828 over Phases A 414, B 416, and C 418.

The system 400 checks to determine whether the low priority data transmission is complete 830. If not, then the system 400 continues transmitting low priority data 806. If yes, then the system 400 checks if high priority data is still being transmitted 832. If yes, then the system 400 transmits high data 834 over Phases A 414 and C 418. If not, then the system 400 checks if medium priority data is still being transmitted 836. If yes, then the system 400 transmits medium priority data 838 over Phases A 414, B 416, and C 418.

The above process 800 is an exemplary process for managing data traffic. Other processes may be used in other situations, such as other methods of cauterizing the data being transmitted.

At least one of the technical solutions to the technical problems provided by this system may include: (i) improved security for BPL systems; (ii) improved data transfer speeds for BPL systems; (iii) increased reliability for BPL systems; (iv) allow for secure data transfers to and from vehicles; (v) increased flexibility in data transfer systems; (vi) dynamic bandwidth allocation; and (vi) increased security for aircraft systems.

The methods and systems described herein may be implemented using computer programming or engineering techniques including computer software, firmware, hardware, or any combination or subset thereof. As disclosed above, at least one technical problem with prior systems is that there is a need for systems for a cost-effective and reliable manner for BPL communications. The system and methods described herein address that technical problem. The technical effects may be achieved by performing at least one of the following steps: (a) executing a first virtual machine and a second virtual machine; (b) receiving, via the first virtual machine, a first plurality of data for transmission via the BPL connection; (c) receiving, via the second virtual machine, a second plurality of data for transmission via the BPL connection; (d) transmitting, via the BPL connection, the first plurality of data via a first phase of a power line associated with BPL connection; and (e) transmitting, via the BPL connection, the second plurality of data via a second phase of the power line associated with BPL connection.

Although described with respect to an aircraft broadband power line application, embodiments of the disclosure are also applicable to other vehicles such as ships, barges, and boats moored at a dock or pier and also wheeled vehicles parked in a service area.

The above-described methods and systems for transmitting power and digital communication to provide high speed Internet service support directly to the aircraft while at the gate are cost-effective, secure and highly reliable. The methods and systems include integration and use of BPL or X10 similar technology into the aircraft and airport infrastructure to support broadband Internet and data services to the aircraft with minimal infrastructure impacts and cost. The integration of BPL, X10, or similar technology into the airport and aircraft permit using the existing aircraft gate umbilical to provide the aircraft with high-speed and high reliability Internet and data services from the airport gate. Accordingly, the methods and systems facilitate transmitting power and digital communication in a secure, cost-effective, and reliable manner.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein may include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal As described above, the described embodiments enable secure vehicle broadband communication with a data network. More particularly, the present disclosure is directed to using broadband over powerline (BPL) communications to enable aircraft information exchange to occur at increased speeds and where conventional data exchange services may not be available. More specifically, a master control unit on the ground and a slave unit on the aircraft set-up a two-way communication channel over one or more powerlines and ensure the security and the integrity of the data being transferred over the powerline. The master control unit also ensures that the data is transmitted to its intended destination via the most efficient wireless network.

The above-described methods and systems for BPL communication are cost-effective, secure, and highly reliable. The methods and systems include executing a first virtual machine and a second virtual machine, receiving, via the first virtual machine, a first plurality of data for transmission via a BPL connection, receiving, via the second virtual machine, a second plurality of data for transmission via the BPL connection, transmitting, via the BPL connection, the first plurality of data via a first phase of a power line associated with BPL connection, and transmitting, via the BPL connection, the second plurality of data via a second phase of the power line associated with BPL connection. Accordingly, the methods and systems facilitate improving the use, efficiency, and security of BPL communication by improving the BPL communication systems ability to communicate via the 115 Vac, 400 Hz, three-phase power system.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A broadband over powerline (BPL) unit comprising:
   at least one processor;
   at least one memory device in communication with the at least one processor; and
   a powerline transceiver in communication with the at least one processor,
   wherein the at least one processor is programmed to transmit and receive data over a three-phase power line via the powerline transceiver, and wherein the at least one processor is further programmed to:
      execute a first virtual machine, a second virtual machine, and a third virtual machine, wherein the first virtual machine is associated with data of a first priority, wherein the second virtual machine is associated with data of a second priority, and wherein the third virtual machine is associated with data of a third priority;
      receive, via the first virtual machine, a first plurality of data of the first priority for transmission via the powerline transceiver;
      receive, via the second virtual machine, a second plurality of data of the second priority for transmission via the powerline transceiver;
      simultaneously, transmit, via the powerline transceiver, the first plurality of data via a first phase of the three-phase power line and the second plurality of data via a second phase of the three-phase power line;
      determine when the first plurality of data has completed transmission; and
      when the first plurality of data has completed transmission, transmit, via powerline transceiver, the second plurality of data via the first phase and the second phase.

2. The BPL unit in accordance with claim 1, wherein data of the first priority and the second priority are encoded in the transmissions via the powerline transceiver.

3. The BPL unit in accordance with claim 1, wherein the BPL unit is one of onboard of an aircraft and ground-based in communication with an aircraft.

4. The BPL unit in accordance with claim 1, wherein the BPL unit is disposed onboard an aircraft and configured to communicate utilizing a powerline transceiver to enable data communication with ground based devices via BPL connection through an electrical aircraft umbilical, which is coupled to the aircraft when the aircraft is on the ground where electrical three-phase power is supplied by a ground power system to the aircraft via the electrical aircraft umbilical.

5. The BPL unit in accordance with claim 1, wherein the at least one processor is further programmed to:
   receive a fourth plurality of data via the powerline transceiver;
   determine which virtual machine to route the fourth plurality of data; and
   route the fourth plurality of data to the corresponding virtual machine.

6. The BPL unit in accordance with claim 1, wherein the BPL unit is in communication with a second BPL unit connected to the three-phase power line, wherein the second BPL unit is executing a first virtual machine associated with the first priority, and wherein the at least one processor is further programmed to:
   divide the first plurality of data into a first plurality of messages; and
   tag each of the first plurality of messages with a first tag indicating that each message is associated with the first priority, wherein the first virtual machine of the second BPL unit is programmed to receive messages from the three-phase power line with the first tag.

7. The BPL unit in accordance with claim 6, wherein the second BPL unit is executing a second virtual machine associated with the second priority, and wherein the at least one processor is further programmed to:
   divide the second plurality of data into a second plurality of messages; and
   tag each of the second plurality of messages with a second tag indicating that each message is associated with the second priority, wherein the second virtual machine of the second BPL unit is programmed to receive messages from the three-phase power line with the second tag.

8. The BPL unit in accordance with claim 1, wherein the at least one processor is further programmed to:
   receive, via the third virtual machine, a third plurality of data for transmission via the powerline transceiver; and
   transmit, via the powerline transceiver, the third plurality of data via the third phase of the three-phase power line.

9. The BPL unit in accordance with claim 8, wherein the at least one processor is further programmed to transmit the first plurality of data, the second plurality of data, and the third plurality of data, simultaneously.

10. The BPL unit in accordance with claim 9, wherein the at least one processor is further programmed to:
   determine that the first plurality of data and the second plurality of data are finished transmitting; and transmit, via the powerline transceiver, the remaining third plurality of data via the first phase, the second phase, and the third phase.

11. The BPL unit in accordance with claim 1, wherein the first virtual machine encrypts the first plurality of data using a first encryption method.

12. The BPL unit in accordance with claim 11, wherein the second virtual machine encrypts the second plurality of data using a second encryption method, wherein the second encryption method is different from the first encryption method.

13. The BPL unit in accordance with claim 12, wherein the powerline transceiver is configured to encrypt data to be transmitted using a third encryption method.

14. A method for communicating via a BPL connection implemented by a BPL unit including at least one processor in communication with at least one memory device, the method comprising:
  executing a first virtual machine, a second virtual machine, and a third virtual machine, wherein the first virtual machine is associated with data of a first priority, wherein the second virtual machine is associated with data of a second priority, and wherein the third virtual machine is associated with data of a third priority;
  receiving, via the first virtual machine, a first plurality of data of the first priority for transmission via the BPL connection;
  receiving, via the second virtual machine, a second plurality of data of the second priority for transmission via the BPL connection; and
  simultaneously transmitting, via the BPL connection, the first plurality of data via a first phase of a three-phase power line associated with the BPL connection and the second plurality of data via a second phase of the three-phase power line associated with BPL connection;
  determine when the first plurality of data has completed transmission; and
  when the first plurality of data has completed transmission, transmit, via powerline transceiver, the second plurality of data via the first phase and the second phase.

15. The method in accordance with claim 14, wherein data of the first priority and the second priority are encoded in the transmissions via the BPL connection.

16. The method in accordance with claim 14 further comprising:
  encrypting, via the first virtual machine, the first plurality of data using a first encryption method; and
  encrypting, via the second virtual machine, the second plurality of data using a second encryption method, wherein the second encryption method is different from the first encryption method.

17. The method in accordance with claim 14 further comprising:
  receiving a fourth plurality of data via the BPL connection;
  determining which virtual machine to route the fourth plurality of data; and
  routing the fourth plurality of data to the corresponding virtual machine.

18. The method in accordance with claim 14, wherein the BPL unit is in communication with a second BPL unit connected to the three-phase power line, wherein the second BPL unit is executing a first virtual machine associated with the first priority, and wherein the method further comprises:
  dividing the first plurality of data into a first plurality of messages; and
  tagging each of the first plurality of messages with a first tag indicating that each message is associated with the first priority, wherein the first virtual machine of the second BPL unit is programmed to receive messages from the three-phase power line with the first tag.

19. The method in accordance with claim 14 further comprising:
  executing a third virtual machine;
  receiving, via the third virtual machine, a third plurality of data for transmission via the BPL connection; and
  transmitting, via the BPL connection, the third plurality of data via a third phase of the three-phase power line associated with BPL connection.

20. The method in accordance with claim 19 further comprising:
  determining that the first plurality of data and the second plurality of data are finished transmitting; and
  transmitting, via the BPL connection, the remaining third plurality of data via the first phase, the second phase, and the third phase, simultaneously.

* * * * *